April 11, 1939.  J. HILEMAN  2,153,834
VALVE MECHANISM
Filed Aug. 20, 1936
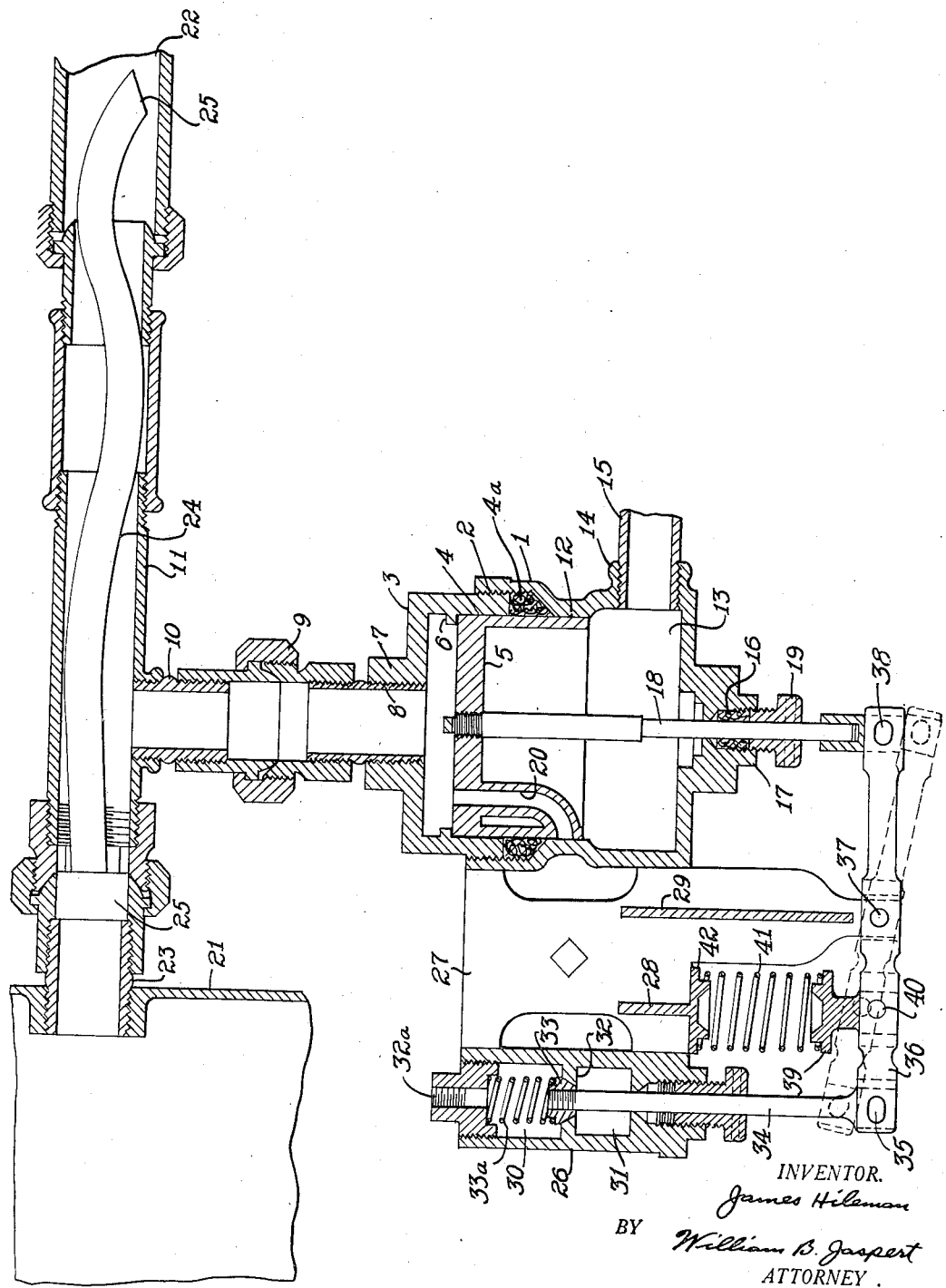
INVENTOR.
James Hileman
BY
William B. Jaspert
ATTORNEY.

UNITED STATES PATENT OFFICE 2,153,834

VALVE MECHANISM

James Hileman, Swissvale, Pa.

Application August 20, 1936, Serial No. 97,001

1 Claim. (Cl. 137—153)

This invention relates to new and useful improvements in valve mechanism especially adapted for use in hot water heating and storage systems, it being among the objects of the invention to provide a combined water flow control and fuel control valve mechanism adapted to coordinate the function of the burner in accordance with the delivery of hot water either to a service line or to a hot water storage tank.

Another object of the invention is the provision of a valve coordinating mechanism controlling the operation of a pair of valves which shall be of simple durable mechanical construction and positive in its action to control the valve movements.

These and other objects of the invention will become more apparent from a consideration of the accompanying drawing constituting a part hereof in which the single figure is a vertical cross-sectional view of valve mechanism embodying the principles of the invention. In the drawing, the numeral 1 designates a valve housing having a threaded end 2 for receiving a valve head 3, a portion of which, designated by the numeral 4, constitutes a cylinder for a piston valve 5, the cylindrical portion 4 of the head 3 being provided with a shoulder 6 constituting an abutment for the piston 5. The head 3 is provided with a threaded end 7 for receiving a nipple 8 which connects to a union 9, one end of which is connected by a nipple 10 to a horizontal pipe line 11, which will be hereinafter described in greater detail.

The valve housing 1 is itself provided with a cylindrical inner wall 12 corresponding in diameter to the cylindrical wall 4 of the valve head 3 for engaging the wall of the piston 5 and the bottom of the valve housing is provided with an enlarged chamber 13 having an offset portion 14 for threaded connection with a pipe 15 leading to a place of use, such as a faucet. A space is provided between the valve housing 1 and head 3 for a packing gland 4a which prevents leakage past piston 5. By turning head 3, the packing 4a may be compacted to any desired degree. The bottom wall of the casing 1 is provided with a recessed portion 16 for receiving a packing gland 17 which is designed to seal the rod 18 of the piston 5 against leakage, a screw nut 19 interacting with the thread of the bottom portion of the valve casing acting to compact the sealing gland 17.

Piston 5 is provided with a flow passage 20 extending from the top of the piston to an opening in the sidewall adjacent the bottom of the piston to permit flow of fluid through passage 20 from one side of the piston to the other when the piston is depressed to extend the opening of the passage 20 into the enlarged chamber portion 13 of the valve housing.

Referring to the pipe connection 11, its function is to establish a flow passage from a hot water storage tank 21 to the heating coil of a hot water heater, the end 22 leading to the coil or other heat exchange flow passage. The connection 11 is fitted to tank 21 by a nipple 23 and a sinuous-shaped pipe 24, having an enlarged end 25, is connected in the pipe 11 between the storage tank 21 and the nipple 10 leading to the valve, the end of the pipe 24 terminating at 25.

A second valve herein designated a burner valve 26 is joined to the valve housing 1 by a web 27 having ribs 28 and 29, the valve 26 having an inlet chamber 30 and a gas outlet chamber 31 partitioned at 32, said chambers communicating in accordance with the regulation of a control valve 33.

Valve 33 is provided with a stem 34 pivotally connected at 35 to a rocker arm 36. Rocker arm 36 is fulcrumed at 37 to the web element 27 and is pivotally connected at 38 to the bottom of the piston valve stem 18. A spring seat 39 is pivotally connected at 40 to the rocker arm 36 and a coil spring 41 is disposed between the spring seat 39 and a spring seat 42 provided in an offset portion of the web 27. The operation of the above-entitled valve mechanism is briefly as follows:

When the passage of fluid through the pipe line 15 is shut-off as by the closing of a faucet, not shown, piston 5 will be in its raised upper position, abutting the shoulder 6 to which it is biased by the coil spring 41, as shown in the drawing. In this position, which is the horizontal position of the rocker arm 36, valve 33 will engage its seat in the partition wall 32, thus shutting off communication between the gas inlet and outlet chambers 30 and 31, respectively. Valve 33 is further biased against its seat by a coil spring 33a which, together with the coil spring 41, maintain the normal inoperative or closing positions of the valves 5 and 33, respectively.

In the closed position of the valves, a small amount of gas or fuel is continually delivered to the burner through an opening 32a at the top of the valve housing 26, and the heat of the burner, which is located below the heat exchanger, such as a coil, will warm the water in the coil, and cause it to flow into the horizontal connection 11 and through the sinuous pipe 24 into the hot water storage tank 21.

When, however, the service line 15 is opened to draw water, there will not be a flow from tank 21 through the pipe 24 and thence into the valve connection 10, but flow will be established from the coil through the end 22, thence around the pipe 24 and into the connection 10, from which it passes downwardly through the nipple 8 to act against the top of the piston 5. Fluid pressure acting on piston 5 will overcome the tension of the springs 33a and 41, respectively, and cause a displacement of the rocker arm 36 to the dotted line position shown in the drawing. When so displaced, the flow passage 20 of the piston 5 will open into the enlarged chamber 13 of the valve casing, permitting the flow of water from the upper portion of the piston to the lower chamber, and thence through pipe line 15 to use.

As the valve 5 opens, the rocker arm 36 will raise valve 33 from its seat and permit the flow of a relatively large volume of gaseous fuel from the inlet chamber 30 to the outlet chamber 31, which is connected to a burner underneath the heating coils, thus increasing the capacity of the burner to further heat the water flowing through the coil and to the service line 15, which has already been preheated by its circulation through the coil and the sinuous pipe 24 to the tank. When the service connection 15 is shut-off, the pressure will equalize on both sides of the valve piston 5, and coil springs 33a and 41 will act to depress the rocker arm 36 to raise piston 5 and close the valve 33.

During the flow of hot water from the coil through the connection 11 into the valve casing 1 to use, the water will not flow from the mouth end 25 of the sinuous pipe 24 into the tank but will take the path of least resistance through the enlarged connector pipe 11 into the valve casing 1. By means of the unit construction of the water and fuel valves and the rocker arm connection, as shown in the drawing, the valve mechanism will maintain proper adjustment and alignment and will not be subjected to displacement or any appreciable amount of wear, thus making it a dependable attachment for hot water storage systems.

It is further evident from the drawing that the valve construction is such that all of the working parts are accessible for inspection or replacement.

Although one embodiment of the invention has been herein illustrated and described it will be apparent to those skilled in the art that various modifications may be made in the details of construction without departing from the principles herein set forth.

I claim:

A valve mechanism comprising a valve housing having a cylindrical wall of relatively small axial dimension and having a removable head forming an extension of said wall and a shoulder portion extending inwardly from its cylindrical wall spaced from the top of said head, a piston disposed in the cylindrical walls of said valve housing and head and having a flow passage extending from the top of the piston to the cylindrical wall of the valve housing, said piston normally abutting against the radial shoulder of the casing head and said piston being provided with a stem extending below the valve housing, a fluid inlet connection above the piston and a fluid outlet connection below the piston, a second valve housing joined to said first-named valve housing having a partition dividing the interior thereof into an inlet and outlet chamber for connections with a source of the gaseous fuel and a burner respectively, a valve controlling the flow of fuel between said chambers, said valve having a stem extending below the valve casing and in spaced relation parallel with the stem of the piston of said first named valve, a rocker arm pivotally connected at its respective ends to said valve and piston stems and being fulcrumed at substantially the center thereof, a spring abutting against the rocker arm on one side of its fulcrum to normally hold the piston of the first named valve against its abutting shoulder and to normally seat the second named valve, said valve mechanism being operative upon the opening of the flow passage from below the piston of the first named valve to open said piston and permit the flow of fluid from the valve inlet to the valve outlet, and simultaneously open the fuel supply valve.

JAMES HILEMAN.